United States Patent [19]
Roethig et al.

[11] Patent Number: 6,028,440
[45] Date of Patent: Feb. 22, 2000

[54] ESTIMATION OF VOLTAGE DROP AND CURRENT DENSITIES IN ASIC POWER SUPPLY MESH

[75] Inventors: Wolfgang Roethig; Lieu T. Nguyen, both of San Jose, Calif.

[73] Assignee: LSI Logic Corporation, Milpitas, Calif.

[21] Appl. No.: 09/045,190

[22] Filed: Mar. 20, 1998

[51] Int. Cl.[7] .................................................. G01R 31/26
[52] U.S. Cl. ....................................... 324/765; 324/158.1
[58] Field of Search ................................ 324/158.1, 765; 395/500.02, 500.05, 500.06, 500.09, 500.39

[56] References Cited

U.S. PATENT DOCUMENTS 4,730,160   3/1988   Cusack et al. ......................... 324/158.1
5,799,172   8/1998   Gullapalli et al. .................. 395/500.35

*Primary Examiner*—Josie Ballato
*Assistant Examiner*—Russell M. Kobert

[57] ABSTRACT

The present invention provides an analytical solution for voltage drop and current density calculation based on design-specific current consumption. The new technique calculates voltage drop and current density at all desired points of the power supply mesh. One application of the method is power mesh sizing by scaling the mesh resistance by the ratio between allowed voltage drop budget and the maximum of the calculated voltage drop. The designer can easily obtain the maximum allowed resistance of a uniform mesh which meets exactly the voltage drop budget, taking into account the design-specific spatial distribution of current consumption. Since the computational cost of the new methodology is negligible, e.g. as compared to prior art methods of analysis, this invention is suitable for implementation embedded in an RTL floorplan tool for fast, interactive tradeoff between floorplan location and voltage drop.

10 Claims, 3 Drawing Sheets

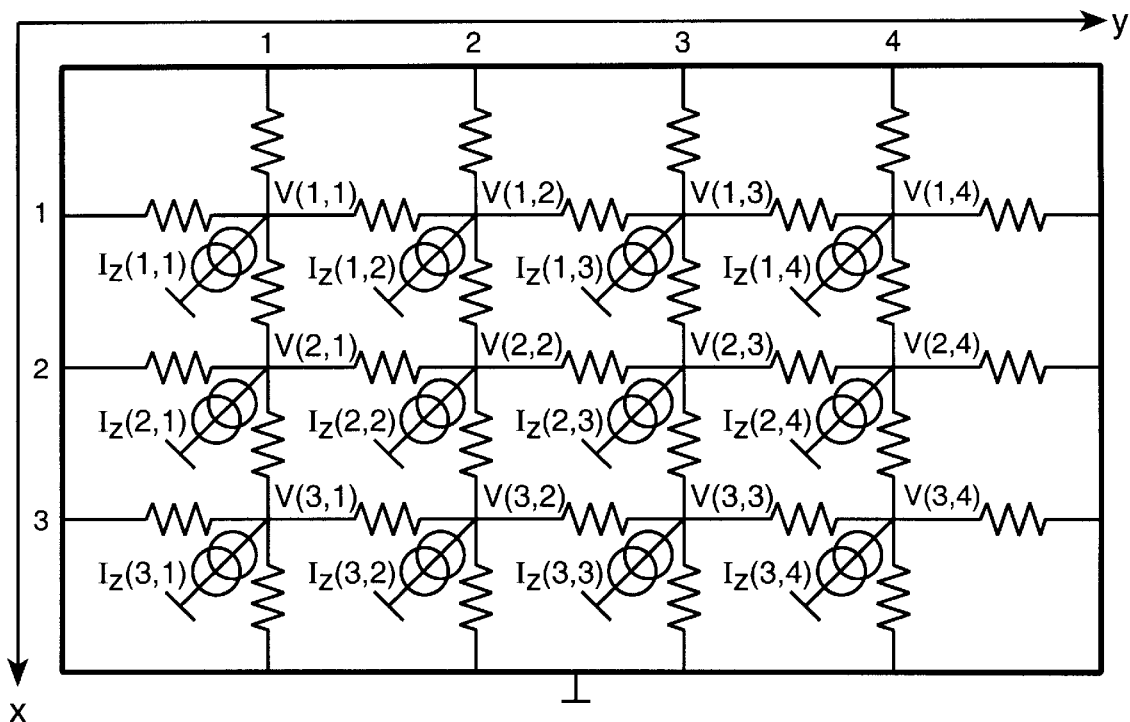
FIG._1
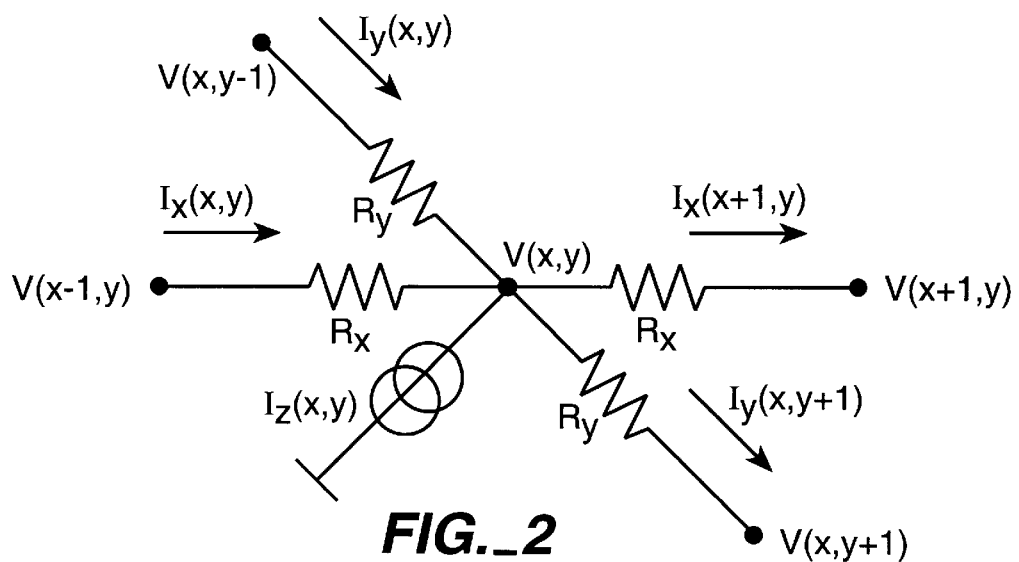
FIG._2

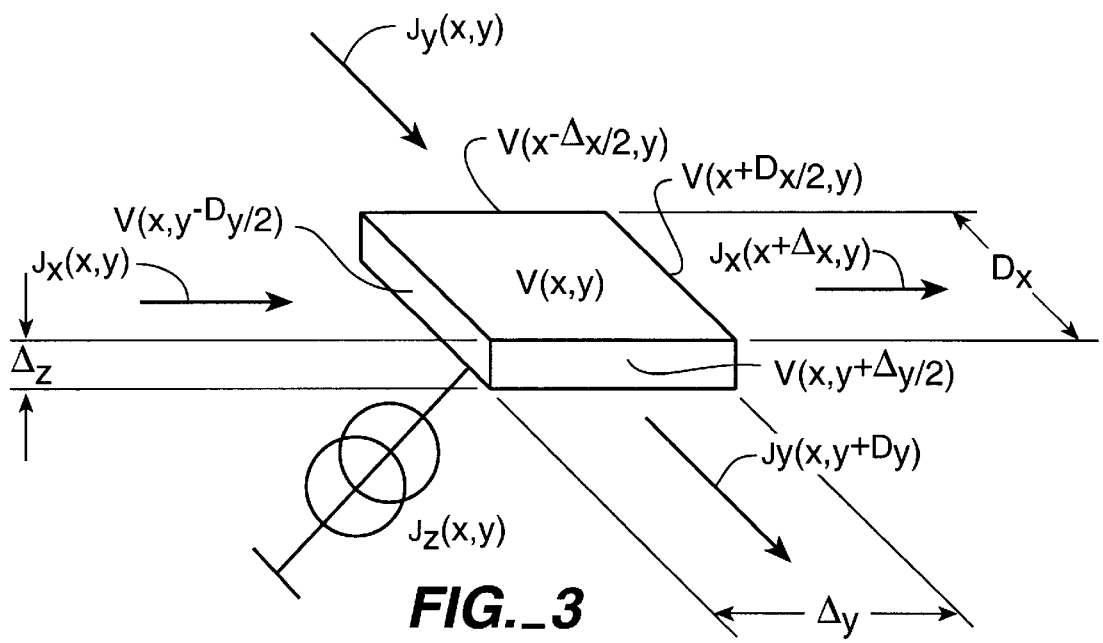
FIG._3
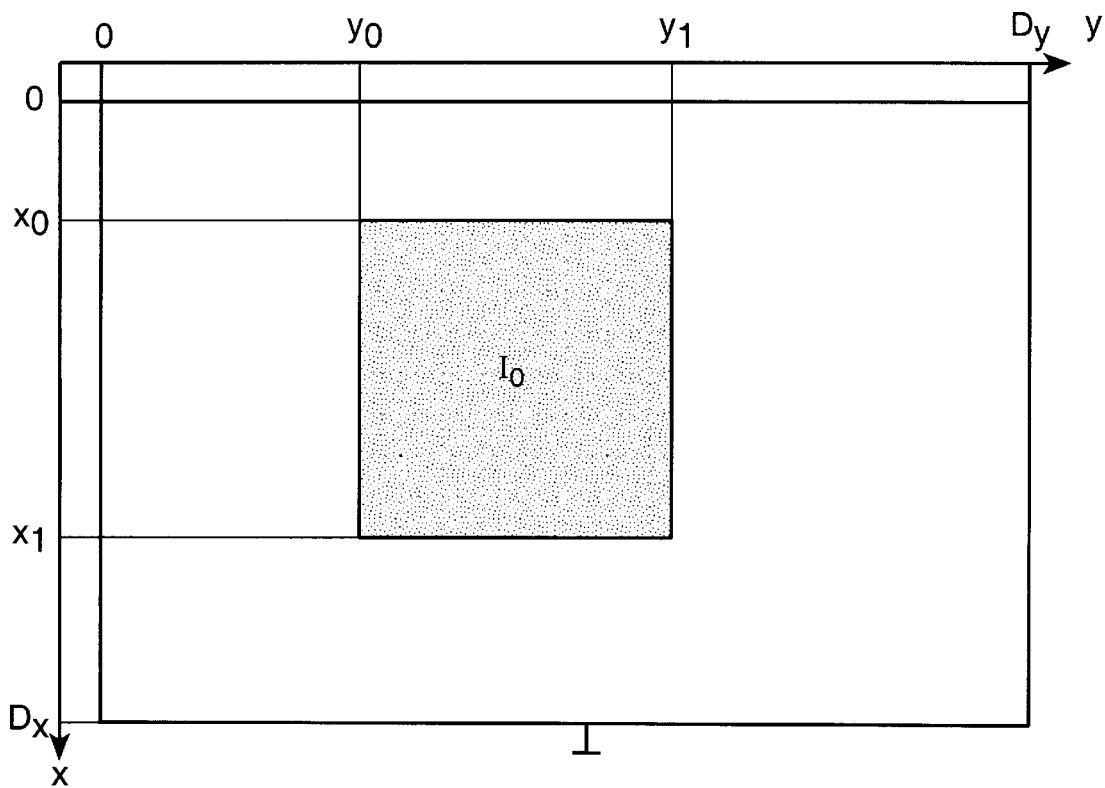
FIG._4

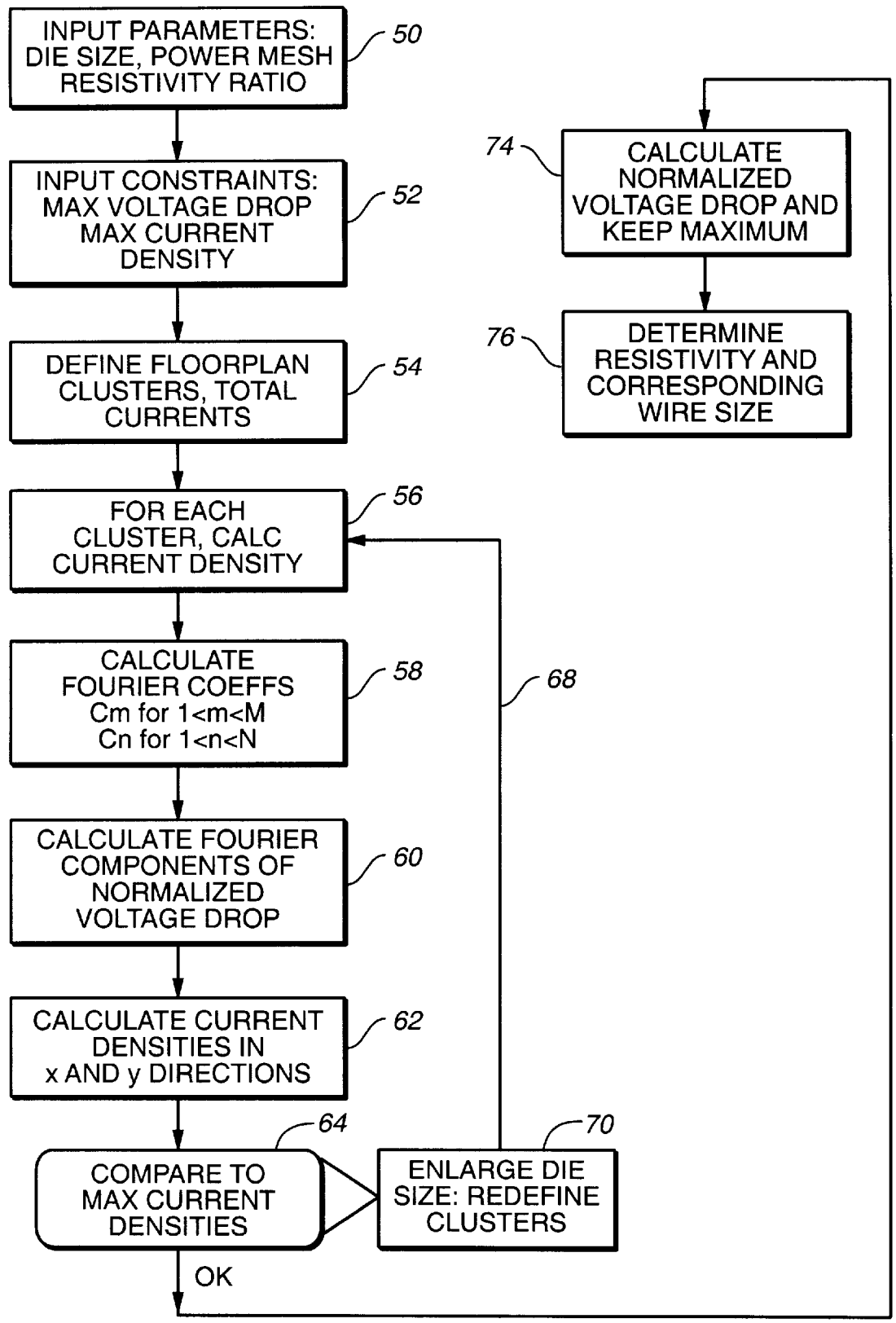
FIG._5

ESTIMATION OF VOLTAGE DROP AND CURRENT DENSITIES IN ASIC POWER SUPPLY MESH

BACKGROUND OF THE INVENTION

1. Field of the Invention

The present invention is in the field of semiconductor integrated circuit design and, more specifically, pertains to methodologies and design tools for ensuring power integrity in VLSI integrated circuit designs.

2. General Background

An ASIC may have dozens of separate circuit blocks or cores arranged on the chip and interconnected to form a system to meet specific needs. Many such blocks are well defined in advance and made available to the designer "off the shelf" in libraries provided by the ASIC vendor. Other blocks or cores may be licensed from third parties, e.g. a RISC core or DRAM block, while typically additional circuitry is custom designed by the ASIC customer for its specific application. The complete system design, including the power mesh (described below), must provide appropriate voltages to all of these circuit elements.

While ASIC design processes vary from one project to another, they often begin by defining the system at a relatively high level of abstraction, which may be an RTL (register-transfer level) description, for example. Such a description is independent of any specific circuit technology. Even at this level, the designer begins a preliminary layout or "floorplan" of the chip, and forms early estimates of gate count, chip size, power dissipation, pin count, etc. As the system becomes more specifically defined, usually in an HDL like Verilog, more precise estimates of various parameters become available. However, inaccuracies in early estimates can severely impact project budget and schedules. For example, extensive resources expended in simulation and analysis of simulation results can be wasted if the designer is forced to "back up" to revise floorplan or packaging estimates.

One essential requirement of a chip design is that adequate power be provided to all of the circuitry on the chip. The power supply requirements must take into account gate count, clock speeds, switching times, simultaneous switching noise, etc. to ensure proper operation of the system. However, while power supplied to the chip must be adequate it also must be minimized. Power dissipation and related thermal considerations severely limit the power consumption of a chip. These issues are ever more critical as circuit densities, e.g. as reflected in gate count, as well as clock speeds, continue to increase.

Large scale integrated circuits typically have a uniform power/ground distribution "mesh" for distributing power to the various circuits formed on the common substrate or "chip". The uniform power/ground mesh (or simply "power mesh") includes a "power ring"—a low-resistance conductor formed around the periphery of the chip core. Typically several bonding wires connect the power ring to one or more assigned external pins. Inside the power ring, a first series of wires are formed spaced apart in parallel and traversing the ring, for example in the x-direction, while a second series of wires are similarly formed in the y-direction (normal to the x-direction). Generally the first wires are formed in a first metallization layer, while the second (perpendicular) wires are formed in a second metallization layer. Vias with negligible resistance are formed at each intersection between the wires so as to interconnect the metallization layers, thus completing the power mesh. FIG. 1 is a circuit model of a small uniform power/ground distribution network for illustration.

In prior art, the designer obtains or generates a circuit model of the power mesh. A circuit simulation tool, e.g. SPICE, or a general purpose matrix solver is used to analyze the power mesh circuit model. The designer must determine the spatial distribution of voltage drop—sometimes called voltage mapping—as well as lateral current densities of the power supply mesh, in response to the specific current consumption requirements of every circuit element of the design. The prior art methodology (described in greater detail later) applies discrete equations for power integrity analysis. In order to solve the voltage $V(x,y)$ for large mesh sizes, e.g. $0 \leq x \leq 100$, $0 \leq y \leq 100$, inversion of a matrix with $100*100=10,000$ unknowns is necessary. This operation can be very expensive in runtime and therefore prohibitive in RTL floorplanning. As noted above, however, improved estimates of power mesh early in the design process can improve overall design and reduce design cycle time.

It is therefore an object of the present invention to provide efficient estimation of power integrity early in the ASIC design cycle.

A further object of the invention is to provide power integrity information to support optimization and design tradeoffs in the ASIC design process.

Another object of the invention is a practical method of obtaining useful power mesh voltage and lateral current estimates for large power meshes.

Yet another object of the invention is to apply a continuous model of the power mesh to speed up computation in power integrity analysis.

A still further object of the invention is to improve integration of power integrity analysis into the design flow, by reducing runtime, obviating dependency on external software, and reducing memory requirements.

Yet another object of the invention is to provide useful estimates of voltage drop and current densities in an RTL floorplan of an ASIC.

A still further object of the invention is to reduce power integrity analysis response time so as to enable fast, interactive tradeoff between floorplan location and voltage drop at the RTL floorplanning stage.

SUMMARY OF THE INVENTION

In view of the foregoing background discussion, one aspect of the present invention includes a method of estimating voltage drop and current density in a power mesh that is independent of the mesh size. According to the invention, the network (circuit elements together with the power mesh) is modeled as a space-continuous structure with distributed resistivity, composed of differential squares. This approach simplifies the power integrity analysis to a problem of manageable size and runtime.

According to another aspect of the invention, a method of estimating voltage drop at selected locations on an ASIC chip includes: obtaining machine readable data defining a preliminary floorplan of the ASIC design, the floorplan defining the sizes and locations of a plurality of functional blocks of rectangular shape. Next the process calls for determining a respective total current demand of each of the functional blocks of the chip. (Methods are known in prior art for estimating total current for a block.) And then, assuming a constant current draw by each of the functional blocks equal to the corresponding total current demand of each of the functional blocks, estimating voltage at selected locations on the ASIC chip as a function of current using two-dimensional spatial Fourier analysis.

More specifically, the new methodology—by modeling the net as a space-continuous structure with distributed resistivity and composed of differential squares—allows simplification of the analysis to computations that are strictly linear with the number of floorplan blocks and the number of points in the voltage drop map required to be calculated. Unless one desires to calculate the voltage drop for each net, the calculation complexity is not even dependent on the number of nets in the power supply mesh. Moreover, the new calculations can be carried out at selectable levels of precision. Thus, the designer can control the computation complexity and hence the runtime as appropriate. In general, this new approach provides fast run time so as to allow interactive power mesh estimation at the floorplanning stage, thereby reducing design cycle time in most cases. Interactive floorplanning lends itself to more efficient implementations, by supporting trading off floorplan vis a vis local voltage drop.

This process can be carried out, according to the invention, at the RTL level—before detailed design and layout. According to the invention, the necessary input is design-specific spatial current consumption, as opposed to global technology data (typically current per gate per megahertz). A computer implementation of the invention can be deployed in connection with a floorplanning tool for efficient, interactive design.

Thus one aspect of the invention is a fast and efficient method of calculating the spatial distribution of voltage drop and lateral current density of a uniform power supply mesh, when a design-specific current consumption distribution is given.

The input is physical information at a level of abstraction that makes it suitable for use in pre-layout planning tools, such as RTL floorplanner. Detailed data defining every wire segment and transistor are not required in order to estimate voltage drop. Nonetheless, the input is the design-specific spatial current consumption distribution per floorplan block. This enables design-specific planning and tradeoffs for power integrity. The current consumption for a given block can be estimated from a high level description using commercially available tools. Or, in some cases, the block will correspond to a standard library cell or core, in which case its characteristics, including current demands, are well defined. The methodology of the present invention for power mesh analysis in integrated circuit design obviates the need for general-purpose matrix solvers, which are usually implemented in simulation programs for voltage drop such as SPICE.

We obtain this unique feature of mesh-size independent calculation complexity by modeling the discrete mesh as a continuum. Our method is exactly fitted to this modeling approach. Hence we achieve an efficient solution of a particular electric field problem instead of a less efficient general-purpose solution like SPICE.

One particular application of our method is power mesh wire sizing, by calculating a normalized voltage drop for a normalized wire resistance and then scaling the actual resistance for the actual voltage drop budget. These and other aspects and advantages of the invention will become more apparent in view of the detailed description, beginning with an overview of the drawings.

BRIEF DESCRIPTION OF THE DRAWINGS

FIG. 1 is a prior art circuit model of a uniform power/ground distribution network of a semiconductor integrated circuit.

FIG. 2 is a discrete model of an individual segment of the network of FIG. 1.

FIG. 3 is a differential model of a mesh segment of a semiconductor integrated circuit according to the present invention.

FIG. 4 is a simplified floorplan diagram of a semiconductor integrated circuit illustrating a constant current rectangle corresponding to a selected block of the integrated circuit. These and other aspects and advantages of the invention will become more apparent in view of the following detailed description.

FIG. 5 is a flowchart of a methodology according to the invention for estimating current densities and wire size interactively at a preliminary floorplanning stage of the circuit design.

DETAILED DESCRIPTION OF A PRESENTLY PREFERRED EMBODIMENT OF THE INVENTION

Modeling IC Power Mesh

Referring now to FIG. 1, we first consider a model of a uniform power/ground distribution mesh as a structure which consists of a power ring with negligible resistance, and inside this power ring it has the following elements:

- wires in x-direction in uniform distance, width and thickness
- wires in y-direction in uniform distance, width, and thickness
- vias with negligible resistance at each cross section between wires.

This network can be described by an electrical circuit which has the following parameters:

| | |
|---|---|
| $R_x$ | resistance of a row segment |
| $R_y$ | resistance of a column segment |
| $N_{row}$ | number of rows |
| $N_{column}$ | number of columns |

At each wire intersection there is a source drawing current from the mesh, which results in voltage drop and lateral currents as follows:

| | |
|---|---|
| $I_z(x,y)$ | current drawn from the mesh (known) |
| $V(x,y)$ | voltage drop at cross section (unknown) |
| $I_x(x,y)$ | lateral current in x-direction (unknown) |
| $I_y(x,y)$ | lateral current in y-direction (unknown) |

An example of a network with $N_{row}=3$ and $N_{column}=4$ is shown in FIG. 1. The network of FIG. 1 responds to a current demand $I_z(x,y)$ by a voltage drop $V(x,y)$. The boundaries are assumed to be equipotential, i.e. $V(0,y)=0$, $V(5,y)=0$, $V(x,0)=0$, $V(x,5)=0$.

Prior Art Discrete Analysis for Uniform Mesh

Each segment (x,y) has known resistance $R_x$ and $R_y$ and known current $I_z(x,y)$ drawn from the mesh. We want to know the voltage $V(x,y)$ and the currents $I_x(x,y)$ and $I_y(x,y)$ in x-and y-direction. The discrete methodology is illustrated in FIG. 2.

Kirchoff's law and Ohm's law for an arbitrary mesh segment read as follows:

$$I_x(x, y) - I_x(x+1, y) + I_y(x, y+1) - I_y(x, y) = I_z(x, y) \quad \text{(D1)}$$

$$I_x(x, y) = \frac{V(x-1, y) - V(x, y)}{R_x} \quad \text{(D2)}$$

$$I_x(x+1, y) = \frac{V(x, y) - V(x+1, y)}{R_x}$$

$$I_y(x, y) = \frac{V(x, y-1) - V(x, y)}{R_y} \quad \text{(D3)}$$

$$I_y(x, y+1) = \frac{V(x, y) - V(x, y+1)}{R_y}$$

Inserting (D2) and (D3) in (D1) yields:

$$I_z(x, y) = \frac{V(x-1, y) - 2V(x, y) + V(x+1, y)}{R_x} + \quad \text{(D4)}$$

$$\frac{V(x, y-1) - 2V(x, y) + V(x, y+1)}{R_y}$$

In order to solve the voltage V(x,y) for large mesh sizes, e.g. 0<x<100, 0<y<100, inversion of a matrix with 100*100=10,000 unknowns is necessary. This operation can be very expensive in runtime and therefore prohibitive in RTL floorplanning as noted above.

New Differential Analysis for Uniform Mesh

In order to address the general problem, we propose an approach, which renders the problem independent of the mesh size. We model the network as a space-continuous structure with distributed resistivity, composed of differential squares with size $\Delta x * \Delta y$, where $\Delta x = \Delta y$. The thickness of the metal is $\Delta z$. This new model is illustrated in FIG. 3. Using specific resistivity $\rho$ the resistances in x and y direction can be expressed as follows:

$$R_x = \rho_x * \Delta x/(\Delta z * \Delta y)$$

$$R_y = \rho_y * \Delta y/(\Delta z * \Delta x)$$

Using current density J, the currents in x, y, and z directions can be expressed as follows:

$$I_x(x, y) = J_x(x, y) * \Delta y * \Delta z$$

$$I_y(x, y) = J_y(x, y) * \Delta x * \Delta z$$

$$I_z(x, y) = J_z(x, y) * \Delta x * \Delta y$$

From Kirchoff's law we obtain $$\frac{J_x(x, y) - J_x(x+\Delta x, y)}{\Delta x} + \frac{J_y(x, y) - J_y(x, y+\Delta y)}{\Delta y} = \frac{J_z(x, y)}{\Delta z}$$

For infinitely small $\Delta x$ and $\Delta y$ we get the following differential equation:

$$\lim_{\Delta x \to 0 \cap \Delta y \to 0} \frac{J_z(x, y)}{\Delta z} = -\frac{d}{dx} J_x(x, y) - \frac{d}{dy} J_y(x, y) \quad \text{[E1]}$$

From Ohm's law we obtain:

$$J_x(x, y) \cdot \Delta y \cdot \Delta z = \frac{V(x - \Delta x, y) - V(x, y)}{\rho_x \cdot \frac{\Delta x}{\Delta y \cdot \Delta z}}$$

$$J_y(x, y) \cdot \Delta x \cdot \Delta z = \frac{V(x, y - \Delta y) - V(x, y)}{\rho_y \cdot \frac{\Delta y}{\Delta x \cdot \Delta z}}$$

which can be rewritten as follows:

$$J_x(x, y) = \frac{V(x - \Delta x, y) - V(x, y)}{\rho_x \cdot \Delta x}$$

$$J_y(x, y) = \frac{V(x, y - \Delta y) - V(x, y)}{\rho_y \cdot \Delta y}$$

For infinitely small $\Delta x$ and $\Delta y$ this yields the following differential equations:

$$\lim_{\Delta x \to 0} J_x(x, y) = -\frac{1}{\rho_x} \cdot \frac{d}{dx} V(x, y) \quad \text{(E2)}$$

$$\lim_{\Delta y \to 0} J_y(x, y) = -\frac{1}{\rho_y} \cdot \frac{d}{dy} V(x, y) \quad \text{(E3)}$$

Combining (E1), (E2) and (E3) we obtain:

$$\frac{J_z(x, y)}{\Delta z} = \frac{1}{\rho_x} \cdot \frac{d^2}{dx^2} V(x, y) + \frac{1}{\rho_y} \cdot \frac{d^2}{dy^2} V(x, y) \quad \text{(E4)}$$

This looks like the classical Poisson's equation. It can be solved by developing $J_z(x,y)$ into a 2-dimensional Fourier series.

The boundary conditions in a rectangle of size $D_x * D_y$ are:

$$V(0, y) = 0$$
$$V(D_x, y) = 0$$
$$V(x, 0) = 0$$
$$V(x, D_y) = 0$$

Considering the space $0 \leq x \leq D_x$ and $0 \leq y \leq D_y$ as half the primitive period of the Fourier series, the boundary conditions are automatically satisfied, if we develop $J_z(x,y)$ only in sine terms.

Developing the Fourier Series

In general, $J_z(x,y)$ can be expressed as product of a scaling factor $J_0$ and two dimensionless functions f(x) and g(y).

$$J_z(x,y) = J_0 * f(x) * g(y)$$

The Fourier series looks as follows:

$$J_z(x, y) = J_0 \cdot \left( \sum_{m=1}^{\infty} C_m \cdot \sin\left(\frac{m \cdot \pi}{D_x} \cdot x\right) \right) \cdot \left( \sum_{n=1}^{\infty} C_n \cdot \sin\left(\frac{n \cdot \pi}{D_y} \cdot y\right) \right)$$

$$J_z(x, y) = J_0 \cdot \sum_{m=1}^{\infty} \sum_{n=1}^{\infty} C_m \cdot C_n \cdot \sin\left(\frac{m \cdot \pi}{D_x} \cdot x\right) \cdot \sin\left(\frac{n \cdot \pi}{D_y} \cdot y\right)$$

The Fourier coefficients $C_m$ and $C_n$ are calculated as follows:

$$C_m = \frac{2}{D_x} \cdot \int_0^{D_x} f(x) \sin\left(\frac{m \cdot \pi}{D_x} \cdot x\right) dx$$

$$C_n = \frac{2}{D_y} \cdot \int_0^{D_y} g(y) \sin\left(\frac{n \cdot \pi}{D_y} \cdot y\right) dy$$

Since $J_z(x,y)$ is a sum-of-products of sine functions, $V(x,y)$ is necessarily also a sum-of-products of sine functions. We define $A_{m,n}$ as the voltage coefficient.

Expressing $V(x,y)$ as a Fourier series and differentiating yields:

$$V(x, y) = \sum_{m=1}^{\infty} \sum_{n=1}^{\infty} A_{m,n} \cdot \sin\left(\frac{m \cdot \pi}{D_x} \cdot x\right) \cdot \sin\left(\frac{n \cdot \pi}{D_y} \cdot y\right)$$

$$\frac{d^2}{dx^2} V(x, y) = \sum_{m=1}^{\infty} \sum_{n=1}^{\infty} -A_{m,n} \cdot \left(\frac{m \cdot \pi}{D_x}\right)^2 \cdot \sin\left(\frac{m \cdot \pi}{D_x} \cdot x\right) \cdot \sin\left(\frac{n \cdot \pi}{D_y} \cdot y\right)$$

$$\frac{d^2}{dy^2} V(x, y) = \sum_{m=1}^{\infty} \sum_{n=1}^{\infty} -A_{m,n} \cdot \left(\frac{n \cdot \pi}{D_y}\right)^2 \cdot \sin\left(\frac{m \cdot \pi}{D_x} \cdot x\right) \cdot \sin\left(\frac{n \cdot \pi}{D_y} \cdot y\right)$$

We can put this into Poisson's equation:

$$\frac{J_z(x, y)}{\Delta z} = \sum_{m=1}^{\infty} \sum_{n=1}^{\infty} (-A_{m,n}) \left(\frac{1}{\rho_x} \cdot \left(\frac{m\pi}{D_x}\right)^2 + \frac{1}{\rho_y} \cdot \left(\frac{n\pi}{D_y}\right)^2\right) \sin\left(\frac{m\pi}{D_x} \cdot x\right) \sin\left(\frac{n\pi}{D_y} \cdot y\right)$$

By comparing the coefficients we obtain:

$$A_{m,n} = \frac{-J_0}{\Delta z} \cdot \frac{C_m \cdot C_n}{\frac{1}{\rho_x} \cdot \left(\frac{m\pi}{D_x}\right)^2 + \frac{1}{\rho_y} \cdot \left(\frac{n\pi}{D_y}\right)^2}$$

Hence we have a closed analytical expression of the voltage as a function of the current, which is developed in Fourier series.

$$V(x, y) = \frac{-J_0}{\Delta z} \cdot \sum_{m=1}^{\infty} \sum_{n=1}^{\infty} \frac{C_m \cdot C_n}{\frac{1}{\rho_x} \cdot \left(\frac{m\pi}{D_x}\right)^2 + \frac{1}{\rho_y} \cdot \left(\frac{n\pi}{D_y}\right)^2} \cdot \sin\left(\frac{m \cdot \pi}{D_x} \cdot x\right) \cdot \sin\left(\frac{n \cdot \pi}{D_y} \cdot y\right)$$

As in the discrete case, we can define the ratio between $p_x$ and $p_y$ as design parameters and calculate the normalized voltage $V(x,y)/p_x$ $$\frac{V(x, y)}{\rho_x} =$$

$$\frac{-J_0}{\Delta z} \cdot \sum_{m=1}^{\infty} \sum_{n=1}^{\infty} \frac{C_m \cdot C_n}{\left(\frac{m\pi}{D_x}\right)^2 + \frac{\rho_x}{\rho_y} \cdot \left(\frac{n\pi}{D_y}\right)^2} \cdot \sin\left(\frac{m \cdot \pi}{D_x} \cdot x\right) \cdot \sin\left(\frac{n \cdot \pi}{D_y} \cdot y\right)$$

Then we find $p_x$ in order to meet the voltage drop budget max $\{V(x,y)\} < V_{budget}$. This determines the required wire size.

Solution for Constant Currents in Rectangular Zones

The solution with Fourier development is general, since every well-behaving function can be developed into Fourier series. However, many coefficients may be needed for convergence and accuracy. For practical application to IC design, we can restrict ourselves to current distributions for which the Fourier coefficients are easy to calculate beforehand, and the number of necessary coefficients is limited.

From a floorplan we get definitions of one or more functional blocks of rectangular shape, and from power analysis we get the total current demand of each block. For simplicity we can assume constant current in each rectangular block. If the total current demand within a rectangle bound by $x_0$, $x_1$, $y_0$, $y_1$ is $I_0$, the current density $J_z(x,y) = J_0 * f(x) * g(y)$ for each individual rectangular block is given by $$J_0 = \frac{I_0}{(x_1 - x_0) \cdot (y_1 - y_0)} \quad f(x) = \begin{cases} 1 & x_0 \leq x \leq x_1 \\ 0 & \text{elsewhere} \end{cases}$$

$$g(y) = \begin{cases} 1 & y_0 \leq y \leq y_1 \\ 0 & \text{elsewhere} \end{cases}$$

Note that $0 < x_0 < x_1 < D_x$ and $0 < y_0 < y_1 < D_y$. Each rectangle is inside the power ring.

The Fourier coefficients for determining current densities are the following:

$$C_m = \frac{2}{D_x} \cdot \int_{x_0}^{x_1} \sin\left(\frac{m\pi}{D_x} \cdot x\right) dx = \frac{2}{m \cdot \pi} \cdot \left(\cos\left(\frac{m\pi}{D_x} \cdot x_0\right) - \cos\left(\frac{m\pi}{D_x} \cdot x_1\right)\right)$$

$$C_n = \frac{2}{D_y} \cdot \int_{y_0}^{y_1} \sin\left(\frac{n\pi}{D_y} \cdot y\right) dy = \frac{2}{n \cdot \pi} \cdot \left(\cos\left(\frac{n\pi}{D_y} \cdot y_0\right) - \cos\left(\frac{n\pi}{D_x} \cdot y_1\right)\right)$$

In the particular case, when the rectangle covers the whole die, i.e. $x_0 = 0$, $x_1 = D_x$, $y_0 = 0$, $y_1 = D_y$, the Fourier coefficients are:

$$C_m = \frac{2}{D_x} \cdot \int_0^{D_x} \sin\left(\frac{m\pi}{D_x} \cdot x\right) dx = \begin{cases} \frac{4}{m \cdot \pi} & \text{for } (m-1)/2 \in N \\ 0 & \text{for } (m-1/2 \notin N \end{cases}$$

$$C_n = \frac{2}{D_y} \cdot \int_0^{D_y} \sin\left(\frac{n\pi}{D_y} \cdot y\right) dy = \begin{cases} \frac{4}{n \cdot \pi} & \text{for } (n-1)/2 \in N \\ 0 & \text{for } (n-1/2 \notin N \end{cases}$$

In the general case for constant current in rectangles, the coefficients $C_m$ and $C_n$ scale with $1/m$ and $1/n$, respectively. Therefore, the number of coefficients needed is reasonably small. If we chose $m < 20$ and $n < 20$, we are sure that the error in neglecting higher order coefficients is not larger than $1/20 = 5\%$. In other words, this analysis permits the designer to select a desired level of accuracy or "granularity" in calculating current densities, by selecting the number of Fourier coefficients C to be used. Greater precision can be achieved by trading off increased computation cost, as more fully explained later. At least a few coefficients, e.g. M,N>3 are required. We have found M,N=20 provides very good results at modest computation cost. As computer performance continues to improve, it can be expected that use of 100 or more coefficient pairs $C_m$ $C_n$ will provide excellent accuracy at speeds that still support interactive floorplanning without any great delay. Thus the designer is free to experiment with alternative floorplans, and mesh designs, and will immediately see the power integrity effects.

Application of the New Methodology

The new technique is preferably implemented in software, e.g. in the C programming language, and proceeds as follows, with reference now to the reference numbers shown in the flowchart of FIG. 5:

1. Get design parameters: (50)

Die size between boundaries of power ring: $D_x$, $D_y$, number of rows and columns of power mesh: $N_{row}$, $N_{column}$ ratio between x and y resistivity $p_x$ /$p_y$ 2. Get design constraints: (52)

maximum allowed voltage drop $V_{budget}$ maximum allowed current densities $J_{x,budget}$ and $J_{y,budget}$ 3. Get rectangular clusters $\{x_{0,cluster}, x_{1,cluster}, y_{0,cluster}, y_{1,cluster}\}$ from floorplan (54)

4. Get current consumption $_{1cluster}$ for each cluster (54)

5. For each cluster, calculate current densities, as described above (56), using the relationship:

$$J_{cluster} = \frac{I_{cluster}}{(x_{1,cluster} - x_{0,cluster}) \cdot (y_{1,cluster} - y_{0,cluster})}$$

select accuracy level by selecting M and N, and calculate Fourier coefficients $C_m$ for $1 \leq m \leq M$ and $C_n$ for $1 \leq n \leq N$ (58)

$$C_{m,cluster} = \frac{2}{m \cdot \pi} \cdot \left( \cos\left( \frac{m\pi}{D_x} \cdot x_{0,cluster} \right) - \cos\left( \frac{m\pi}{D_x} \cdot x_{1,cluster} \right) \right)$$

$$C_{n,cluster} = \frac{2}{n \cdot \pi} \cdot \left( \cos\left( \frac{n\pi}{D_y} \cdot y_{0,cluster} \right) - \cos\left( \frac{n\pi}{D_y} \cdot y_{1,cluster} \right) \right)$$

6. For all Fourier coefficients, i.e. $1 \leq m \leq M$, $1 \leq n \leq N$ (M=20, N=20)

calculate Fourier components $A_{m,n}/p_x$ of normalized voltage drop (60 in FIG. 5), viz:

$$\frac{A_{m,n}}{\rho_x} = \frac{-1}{\Delta z} \cdot \sum_{cluster=1}^{nb. of\ clusters} J_{cluster} \cdot \frac{C_{m,cluster} \cdot C_{n,cluster}}{\left(\frac{m\pi}{D_x}\right)^2 + \frac{\rho_x}{\rho_y} \cdot \left(\frac{n\pi}{D_y}\right)^2}$$

For $0<x<D_x$, step=$D_x/N_{row}$, $0<y<D_y$, step=$D_y/N_{column}$ calculate the current densities in x and y direction (63):

$$-J_x(x, y) = \frac{d}{dx}\left( \frac{V(x, y)}{\rho_x} \right)$$

$$= \sum_{m=1}^{M} \sum_{n=1}^{N} \frac{m\pi}{D_x} \cdot \frac{A_{m,n}}{\rho_x} \cdot \cos\left( \frac{m\pi}{D_x} \cdot x \right) \sin\left( \frac{n\pi}{D_y} \cdot y \right)$$

$$-J_y(x, y) = \frac{\rho_x}{\rho_y} \cdot \frac{d}{dy}\left( \frac{V(x, y)}{\rho_x} \right)$$

$$= \frac{\rho_x}{\rho_y} \cdot \sum_{m=1}^{M} \sum_{n=1}^{N} \frac{n\pi}{D_y} \cdot \frac{A_{m,n}}{\rho_x} \cdot \sin\left( \frac{m\pi}{D_x} \cdot x \right) \cos\left( \frac{n\pi}{D_y} \cdot y \right)$$

and then compare to the maximum current density ( step 64):

$|J_x(x,y)|>J_{x,budget}$ or $|J_y(x,y)|>J_{y,budget}$

If either density exceeds the corresponding limit, the die size is too small. The designer needs to restart with larger die size, redefine the clusters (rectangular blocks), (70) and the process loops via (68) back to determining the current density (56) for the new clusters. The foregoing steps (58) to (64) are repeated as may be necessary.

If the current density is acceptable, we proceed to calculate a normalized voltage drop and determine the maximum voltage drop (74):

$$\frac{V(x, y)}{\rho_x} = \sum_{m=1}^{M} \sum_{n=1}^{N} \frac{A_{m,n}}{\rho_x} \cdot \sin\left( \frac{m\pi}{D_x} \cdot x \right) \cdot \sin\left( \frac{n\pi}{D_y} \cdot y \right)$$

Finally we determine resistivity based on the maximum ($V_{budget}$) allowable voltage drop:

$p_x=V_{budget}/\max \{V(x,y)/p_x\}$. This determines wire size.

Computational Costs

The storage complexity of this method is as follows. For the current density coefficients $\{C_{m,cluster}\}+\{C_{n,cluster}\}$'(M+N)*(number of clusters), where "'" means "proportional to". For the voltage calculation coefficients $\{A_{m,n}/P_x\}$'M*N; and for plotting a "thermal map" of the voltage and branch current distribution, the storage requirements are based on:

$\{V(x,y)/p_x\}+\{J_x(x,y)\}+\{J_y(x,y)\}$'3*$N_{row}$* $N_{column}$

The calculation complexity of the present method is characterized as:

{current density}'nb. of clusters

{Fourier coefficients for current density}'(M+N)*nb. of clusters $\{V(x,y)/p_x\}+\{J_x(x,y)\}+\{J_y(x,y)\}$'$N_{row}$*$N_{column}$ where the calculation is dominated by sine and cosine operations which can be shared between V, $J_x$, and $J_y$. Recall that $N_{row}$ and $N_{column}$ are the numbers of wires in the mesh in x and y dimensions, respectively.

The number of storage and calculation operations needed is dominated by the number of rows and columns, which is much larger than the number of Fourier coefficients and clusters. One example of useful values are:

number of clusters=10 number of Fourier coefficients: M=20, N=20, M*M=400 number of rows and columns: $N_{row}$=100, $N_{column}$=100, ergo $N_{row}$*$N_{column}$=10,000

To summarize, the present invention provides an analytical solution for voltage drop and current density calculation based on design-specific current consumption. The new technique calculates voltage drop and current density at all desired points of the power supply mesh. One application of the method is power mesh sizing by scaling the mesh resistance by the ratio between allowed voltage drop budget and the maximum of the calculated voltage drop. Thus we obtain the maximum allowed resistance of an uniform mesh which meets exactly the voltage drop budget, taking into account the design-specific spatial distribution of current consumption. Since the computational cost of the new methodology is negligible, e.g. as compared to SPICE analysis, this invention is also suitable to be embedded in a RTL floorplan tool for fast interactive tradeoff between floorplan location and voltage drop.

Having illustrated and described the principles of my invention in a preferred embodiment thereof, it should be readily apparent to those skilled in the art that the invention can be modified in arrangement and detail without departing from such principles. We claim all modifications coming within the spirit and scope of the accompanying claims:

We claim:

1. A method of checking for power integrity in a preliminary design for a semiconductor integrated circuit having a power mesh including a power ring formed on a semiconductor die and defining a die size within the boundaries of the power ring, the method comprising the steps of:
   defining the power mesh for the integrated circuit;
   selecting applicable power integrity constraints;
   defining a preliminary floorplan of the design in terms of a plurality of rectangular clusters, each cluster corresponding to a functional block of the design and having a predetermined total current consumption;
   calculating a current density for each of the clusters based on its total current consumption;
   selecting a number of coefficients for analyzing power integrity of the design; and
   estimating a normalized voltage drop of the power mesh responsive to the defined floorplan by applying two-dimensional Fourier spatial analysis using the selected number of coefficients.

2. A method according to claim 1 wherein the power integrity constraints include a maximum normalized voltage drop and further comprising, comparing the estimated normalized voltage drop of the power mesh to the maximum normalized voltage drop; and modifying the definition of the power mesh or modifying the floorplan if the estimated normalized voltage drop of the power mesh exceeds the maximum normalized voltage drop.

3. A method according to claim 1 wherein said defining the power mesh includes selecting x and y dimensions of the integrated circuit die between the boundaries of the power ring, $D_x$ and $D_y$, and selecting a number of first-dimension wires or rows of the power mesh $N_{row}$ and selecting a number of second-dimension wires or columns of the power mesh $N_{column}$.

4. A method according to claim 3 wherein said selecting the number of coefficients includes selecting integer values M and N, where M is the number of Fourier coefficients in the x dimension and N is the number of Fourier coefficients the y direction, for use in estimating power integrity of the design, thereby allowing the designer to trade off storage and calculation complexity relative to desired accuracy in the estimation step.

5. A method according to claim 1 wherein said selecting applicable power integrity constraints includes selecting a maximum normalized voltage drop and selecting a maximum allowed current density for each direction in the power mesh, $J_{x,budget}$ and $J_{y,budget}$.

6. A method according to claim 5 wherein said defining a floorplan of the design in terms of a plurality of rectangular clusters includes defining each cluster in terms of spatial coordinates of the respective corners of the corresponding rectangle $x_{0,cluster}$ $X_{1,cluster}$ $y_{0,cluster}$ $y_{1,cluster}$ for each cluster; and wherein said calculating a current density for each of the clusters includes calculating the current density $J_{cluster}$ according to the formula $$J_{cluster} = \frac{I_{cluster}}{(x_{1,cluster} - x_{0,cluster}) \cdot (y_{1,cluster} - y_{0,cluster})}$$

where $I_{cluster}$ is the total current consumption of the corresponding cluster.

7. A method according to claim 6 wherein said estimating a normalized voltage drop includes first calculating Fourier coefficients $C_m$ and $C_n$ for $1<m<M$ and for $1<n<N$, respectively, according to the formula:

$$C_{m,cluster} = \frac{2}{m \cdot \pi} \cdot \left( \cos\left(\frac{m\pi}{D_x} \cdot x_{0,cluster}\right) - \cos\left(\frac{m\pi}{D_x} \cdot x_{1,cluster}\right) \right)$$

$$C_{n,cluster} = \frac{2}{n \cdot \pi} \cdot \left( \cos\left(\frac{n\pi}{D_y} \cdot y_{0,cluster}\right) - \cos\left(\frac{n\pi}{D_y} \cdot y_{1,cluster}\right) \right)$$

and repeating said calculation for each of the clusters, thereby determining a total number of $C_m$ coefficients equal to the number of clusters times M, and a total number of $C_n$ coefficients equal to the number of clusters x N.

8. A method according to claim 6 wherein said estimating a normalized voltage drop of the power mesh further includes calculating Fourier components $A_{m,n}/p_x$ of the normalized voltage drop as $$\frac{A_{m,n}}{\rho_x} = \frac{-1}{\Delta z} \cdot \sum_{cluster=1}^{nb.\,of\;clusters} J_{cluster} \cdot \frac{C_{m,cluster} \cdot C_{n,cluster}}{\left(\frac{m\pi}{D_x}\right)^2 + \frac{\rho_x}{\rho_y} \cdot \left(\frac{n\pi}{D_y}\right)^2}.$$

9. A method according to claim 8 further comprising calculating current densities in the x and y directions at the selected granularity according to the formulas:

$$-J_x(x, y) = \frac{d}{dx}\left(\frac{V(x,y)}{\rho_x}\right)$$

$$= \sum_{m=1}^{M} \sum_{n=1}^{N} \frac{m\pi}{D_x} \cdot \frac{A_{m,n}}{\rho_x} \cdot \cos\left(\frac{m\pi}{D_x} \cdot x\right) \sin\left(\frac{n\pi}{D_y} \cdot y\right)$$

$$-J_y(x, y) = \frac{\rho_x}{\rho_y} \cdot \frac{d}{dy}\left(\frac{V(x,y)}{\rho_x}\right)$$

$$= \frac{\rho_x}{\rho_y} \cdot \sum_{m=1}^{M} \sum_{n=1}^{N} \frac{n\pi}{D_y} \cdot \frac{A_{m,n}}{\rho_x} \cdot \sin\left(\frac{m\pi}{D_x} \cdot x\right) \cos\left(\frac{n\pi}{D_y} \cdot y\right)$$

and then comparing the calculated current densities to the maximum current densities $J_{x,budget}$ and $J_{y,budget}$.

10. A method according to claim 9 and further comprising, if either or both of the calculated current densities exceeds the corresponding maximum current density, increasing the selected die size of the integrated circuit under design, thereby reducing the current densities; and repeating said calculations of current densities using the increased die size so as to confirm that the design meets the specified power integrity constraints.

* * * * *